United States Patent
Parfitt et al.

(10) Patent No.: US 7,565,269 B2
(45) Date of Patent: Jul. 21, 2009

(54) THRUST CORRECTION

(75) Inventors: Robert N Parfitt, Bristol (GB); Martin R Turville, Nottingham (GB); Maurice C Bristow, Derby (GB); Stephen G Brown, Derby (GB)

(73) Assignee: Rolls-Royce PLC, London (GB)

( * ) Notice: Subject to any disclaimer, the term of this patent is extended or adjusted under 35 U.S.C. 154(b) by 204 days.

(21) Appl. No.: 11/802,507

(22) Filed: May 23, 2007

(65) Prior Publication Data

US 2007/0276601 A1 Nov. 29, 2007

(30) Foreign Application Priority Data

May 25, 2006 (GB) ................... 0610331.1

(51) Int. Cl.
G01M 15/00 (2006.01)
G06F 19/00 (2006.01)
(52) U.S. Cl. .................................... 702/182
(58) Field of Classification Search ............. 702/182, 702/41, 44, 114, 115; 73/112.01, 116.03, 73/861.7, 861.79
See application file for complete search history.

(56) References Cited

U.S. PATENT DOCUMENTS 4,537,066 A * 8/1985 Simpson ................. 73/116.03
4,788,855 A * 12/1988 Laskody ................. 73/112.04
6,851,303 B2 * 2/2005 Parfitt et al. ............. 73/112.01

FOREIGN PATENT DOCUMENTS

GB 2 384 058 A 7/2003

\* cited by examiner

*Primary Examiner*—Michael P. Nghiem
*Assistant Examiner*—Cindy H Khuu
(74) *Attorney, Agent, or Firm*—Oliff & Berridge PLC

(57) ABSTRACT

To determine free field thrust of a gas turbine engine, the gas turbine engine may be attached to a movable support, and operated at a selected engine operating point. The thrust applied by the engine to the thrust cradle is measured. The gas turbine engine intake momentum drag generated by airflow into the gas turbine engine intake, the thrust cradle drag force generated by airflow past the moveable support of the thrust cradle, the base drag generated as a result of accelerating nozzle ejector airflow, a pre-streamtube force related to turning of stream lines in the intake air path, a pre-stream tube force related to a bell mouth pull-off force are calculated. Forces due to forward anemometer plane and nozzle static pressures, and a nozzle exit buoyancy force are summed according to respective positive and negative values to determine the free field thrust at the selected engine operating point.

2 Claims, 3 Drawing Sheets

THRUST CORRECTION

CROSS-REFERENCE TO RELATED APPLICATION

This application claims priority to Great Britain Patent Application No. 0610331.1 filed in Great Britain on May 25, 2006, the entire disclosure of which is hereby incorporated by reference in its entirety.

BACKGROUND

The invention relates to a method for determining the free-field thrust of a gas turbine engine.

In particular the present invention concerns a method for determining the free-field thrust of a gas turbine engine carried out using an enclosed engine test facility of the kind described in our earlier UK Patent GB 2,384,058B, the disclosure of which is incorporated herein by reference.

An indoor gas turbine engine test facility is by design, a low speed wind tunnel. The wind tunnel effect is created by a secondary demand for ambient airflow as a result of the ejector pump action of the engine exhaust jet plume entering the test facility exhaust collector, otherwise called a detuner. This ejector effect creates a secondary demand for entrained/by-pass airflow that is up to five times greater than the initial airflow being demanded by the engine/intake, that is the test facility has an entrainment ratio of 5 to 1.

The creation of this wind tunnel effect is necessary to assist in expelling all undesirable hot gasses from the test cell, and to enable meaningful engine performance measurement and repeatability in a stable and consistent aerodynamic environment of non-turbulent ambient airflow. This will help eliminate any potential instability, hot gas re-ingestion or vortex formation. Also, exposed elements of test facility instrumentation/measurement systems can be cooled with ambient airflow to avoid overheating.

However, this wind tunnel effect creates a drag force acting upon the engine and its support structure, the direction of which is opposite to the thrust measured by the load measurement cells. Therefore, it is necessary to account for this thrust drag debit (typically between 1-8%) with some form of calibration, to enable measured net thrust to be corrected to a set of reference datum conditions that include still air (ISA sea level static), to obtain a corrected gross thrust.

SUMMARY

According to the present invention a method for determining the free field thrust of a gas turbine engine by use of an enclosed gas turbine engine test facility including the steps of attaching the gas turbine engine to a movable support means, operating the gas turbine engine at a selected engine operating point, measuring the thrust applied by the engine to the thrust cradle via the thrust measurement means, calculating the gas turbine engine intake momentum drag generated by airflow into the gas turbine engine intake, calculating the thrust cradle drag force generated by airflow past the moveable support means of the thrust cradle, calculating the base drag generated as a result of accelerating nozzle ejector airflow, calculating a pre-stream tube force related to turning of stream lines in the intake air path, calculating a pre-stream tube force related to a bell mouth pull-off force, determining forces due to forward anemometer plane and nozzle static pressures and a nozzle exit buoyancy force, and summing these forces according to their respective positive and negative values to determine the free field thrust of the engine at the selected engine operating point.

In the present invention, as compared to the invention described in our earlier patent specification GB 2,384,058B, the forward anemometer plane and nozzle static pressures $p_0$ and $P_{ref}$ are used as references in place of cell static pressure $p_{cell}$.

According to another aspect of the invention the procedure of the present method may be repeated at more then one selected engine operating point.

BRIEF DESCRIPTION OF THE DRAWINGS

The invention and how it may be carried out in practice will now be described with reference to an example illustrated by the figures of the accompanying drawings, in which.

DETAILED DESCRIPTION OF EMBODIMENTS

Traditionally, test facility calibration has been carried out as a direct empirical back-to-back comparison of engine performance between the indoor test facility and an outdoor free-field test facility. In making this correction it has been assumed that the engine is located in an infinite atmosphere of still air. Unfortunately, due to inconsistent climatic conditions and environmental issues such as pollution and noise, testing engines on an outdoor test facility has become limited, time consuming and costly. Although the invention has been developed and utilised in the United Kingdom, where such weather conditions are well known, it is not intended that use of the invention should be so limited. We believe the invention will be found to be useful anywhere. Not only do outdoor test facilities in such temperate and changeable weather conditions produces inconsistent results, but indoor test facilities offer a more controllable environment if only for the possibility of excluding foreign objects. Furthermore, the new generation of large civil engines has outgrown currently available "industry standard" outdoor test facilities. Also as a consequence of better understanding of ground effects and micro-climates, and in part better investigative instrumentation and CFD modeling, current estimates of the uncertainty in gross thrust total measurement is estimated to be ±0.5% (random) plus −0.5% to −1.0% (systematic) when using the free field method.

Our earlier patent described an alternative to the free field method based on a first principles methodology for aerodynamic thrust correction for an indoor test facility, using arrays of anemometers and static pressure measurement devices in an extensive aerodynamic survey. This stand-alone methodology can be used in isolation or with reference to any other source, effectively relating an indoor test facility to free field using first principles. The present invention comprises an improvement in the said method using the same basic indoor test facility.

Figure 1:
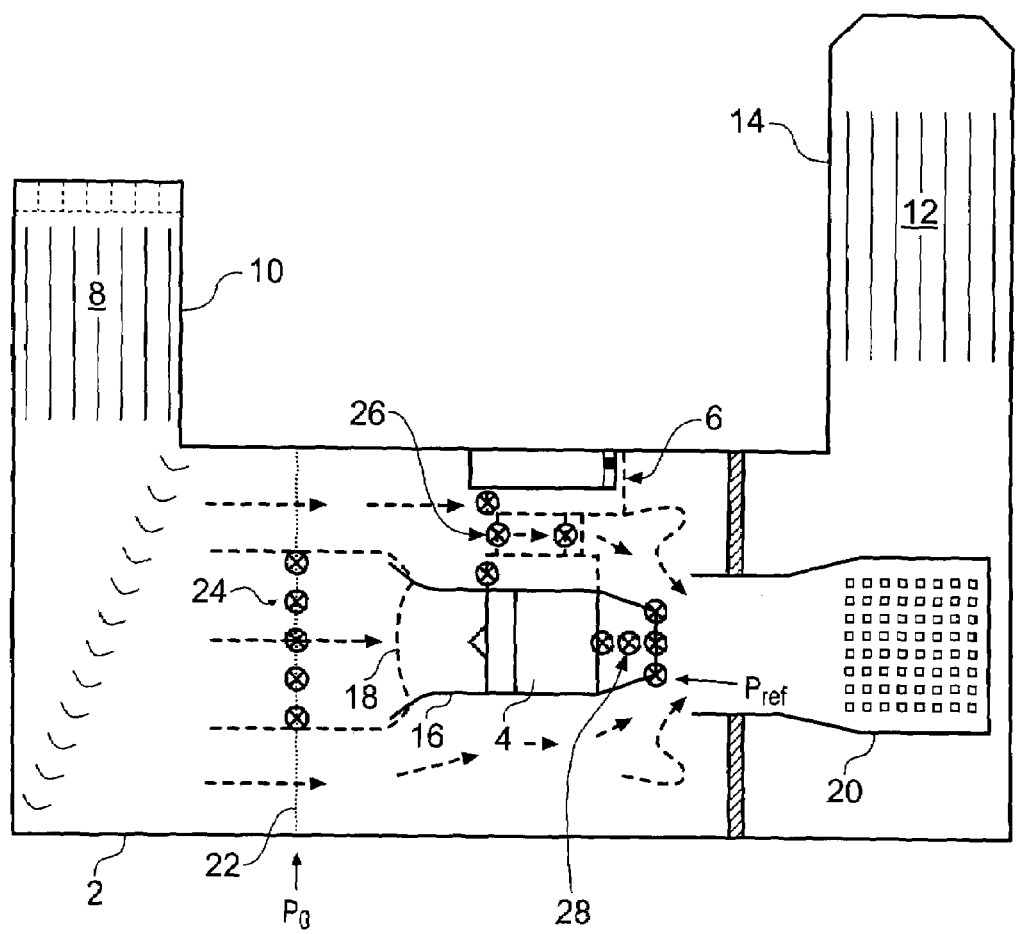
FIG. 1 is a schematic plan view of a typical indoor test facility.

FIG. 1 illustrates a typical indoor "U" shaped sea level test facility with main features, airflow paths and an introduction to first principle measurement planes and positions. The test facility building is indicated in outline at 2, and the gas turbine engine undergoing test at 4 mounted on a pylon generally indicated at 6. Ambient air enters through intake system 8 located in one limb 10 of the "U-shaped" building and exhaust gas and entrained air is expelled through exhaust system 12 housed in the other limb 14 of the building. A flared bell-mouth venturi airmeter 16, incorporating a debris guard 18 is fitted to the front of engine 4, while the hot engine exhaust nozzle is directed into the open mouth of a free standing exhaust detuner 20. From the detuner hot gas escapes into the facility exhaust system 12 and is returned to outside atmosphere. In the drawing of FIG. 1 the various items of measuring apparatus are installed at measuring points marked by an "x".

The measuring apparatus includes a number, typically up to nine but there may be more, shrouded anemometers 24 mounted in cruciform arrangement mounted on a grid 22 upstream of the engine intake. Another series of anemometers 26 are mounted on the engine thrust cradle (or mounting pylon) 6 and at points around the engine to enable measurement of pressure loading due to the bypass airflow. A set of static pressure sensors 28 is mounted on the engine exhaust nozzle.

According to our earlier patent the basic method for determining the free-field thrust of a gas turbine engine using an enclosed engine test facility of this kind assumes a static pressure field equilibrium throughout the test cell facility. Hence, the forces within a "control volume" thrust momentum box, surrounding the engine within the test facility, including the forward anemometer plane can be either measured directly or calculated from direct measurements.

This assumption is considered acceptable for test cell applications in which the airflow velocity is stable, uniform and in the region of 30 ft/sec or less, with an entrainment ratio greater than 2 to 1 and an overall aerodynamic thrust correction of 4% or less. In these cases it is believed that any additional or unaccounted forces, particularly $p0(A0-A1)$ and $p0(A1-A8)$ shown on FIG. 2 are considered negligible (<0.1% of gross thrust), and therefore cancel in the following equation (5).

Therefore $$\text{Gross Thrust} = W_j \cdot V_j + P_j \cdot A_j - P_0 \cdot (A_1 - A_j) - P_0 \cdot (A_0 - A_1) +$$
$$(W_1 \cdot V_0 + P_0 \cdot A_0) + \text{Cradle Drag} + \text{Base Drag}$$
$$= W_j \cdot V_j - (P_j - P_0)A_j + W_1 \cdot V_0 + \text{Cradle Drag} + \text{Base Drag}$$
$$= \text{Net Thrust (measured)} + \text{Inlet Momentum} +$$
$$\text{Cradle Drag} + \text{Base Drag}$$

Current industry standard large civil engine indoor test facilities are unlikely to be able to achieve the aerodynamic requirement assumptions listed for the basic method, particularly regarding minimum airflow velocity. This, coupled with the likelihood of a tighter uncertainty assessment requirement for customer compliance demonstration, necessitates a far more rigorous assessment of any potential additional and unaccounted forces that are deemed negligible with the basic method.

Figure 2:
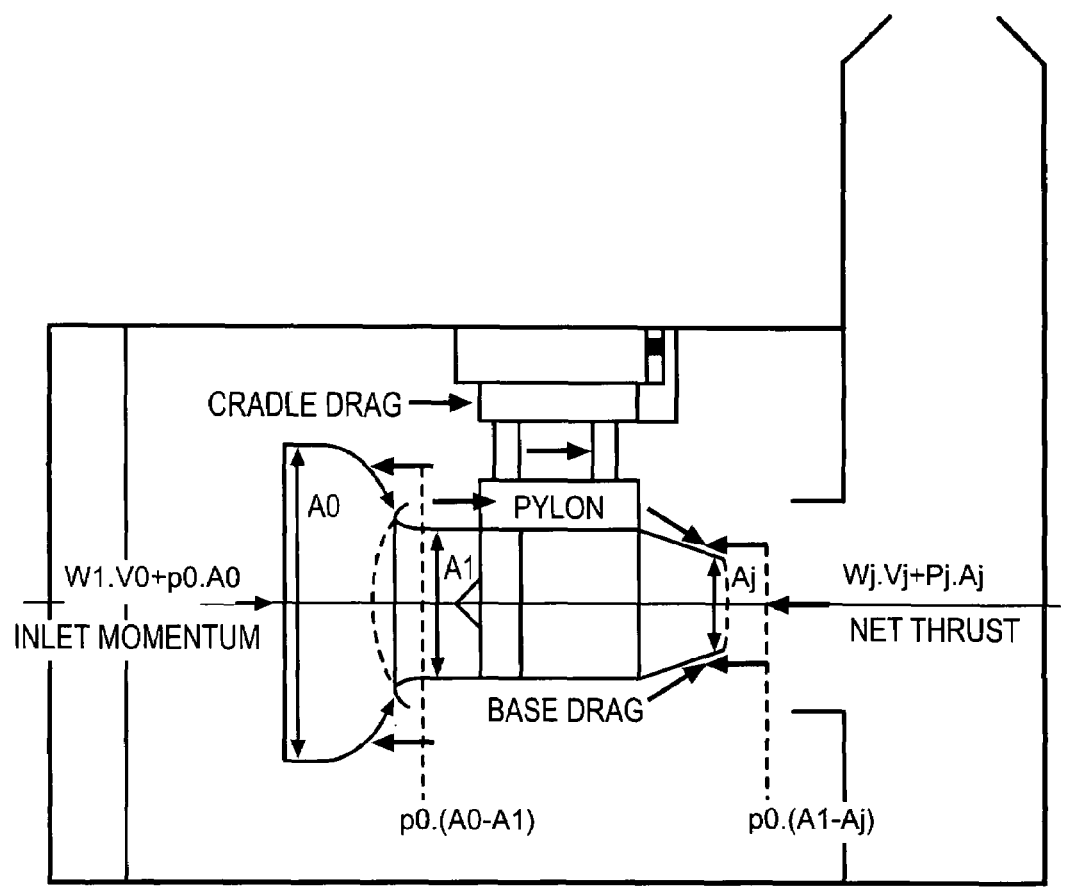
FIG. 2 is a diagrammatic representation of a "first principles" method of the kind described in our earlier patent.
Figure 3:
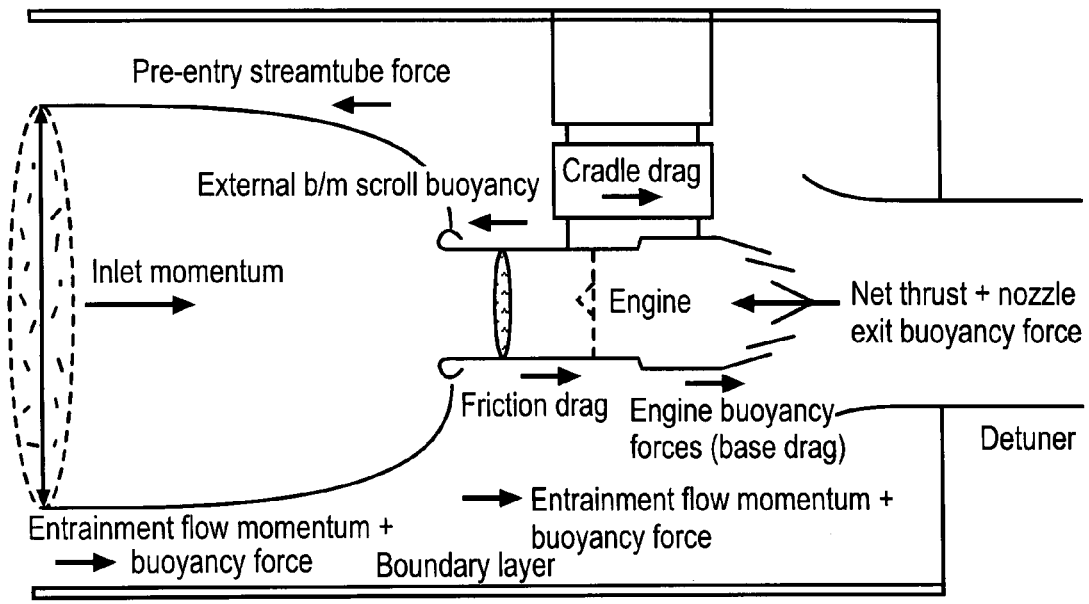
FIG. 3 is a diagrammatic representation of a revised "first principles" method in accordance with the present invention with descriptive annotations.
Figure 4:
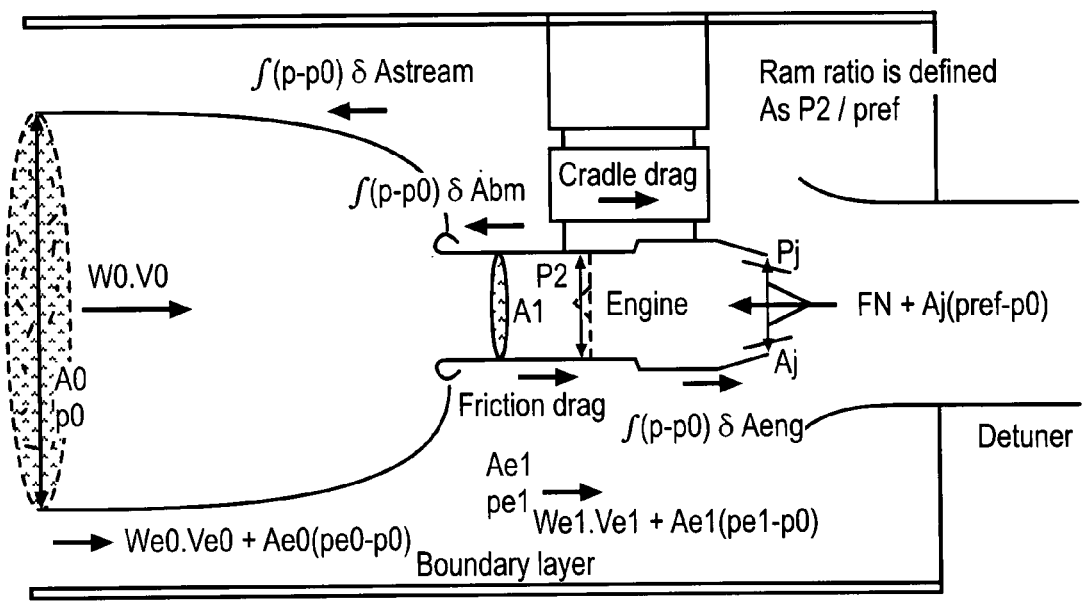
FIG. 4 is a further diagrammatic representation of the revised "first principles" method of FIG. 3 in which the descriptive annotations have been replaced by corresponding equation terms.

Therefore, the additional terms hitherto considered negligible and shown on FIG. 2 are likely to become more significant and need to be quantified as additional engine buoyancy forces. FIGS. 3 & 4 illustrate a revised full control volume thrust momentum box in description and equation form respectively, that enable first principles thrust correction to be aligned with other methods ("ideal free field" or "nozzle rig"), and thus "thrust in flight" accounting for example for the purposes of civil engine compliance demonstration.

Therefore—in descriptive form:

Gross thrust = Net thrust+Inlet momentum−Pre-entry streamtube force−External bell mouth scroll buoyancy+Engine buoyancy forces+Cradle drag+Friction drag−Nozzle exit buoyancy force;

And in equation form:

$$\text{Gross thrust} = FN + W_0 \cdot V_0 - \int (p-p0) \delta A_{stream} - \int (p-p0) \delta A_{bm} + \int (p-p0) \delta A_{eng} + \text{Cradle drag} +$$

$$\text{Friction drag} - A_j(p_{ref} - p0);$$

Where: $-p_{ref} = P_j^*(p0 \text{ "free-field"}/P_j \text{ "free-field"})$ for "free-field" nozzle coefficient accounting, and from entrainment flow.

In addition to the variables accounted for in the basic method the present invention involves expanded calculation of the following additional requirements which are included in order to enable the derivation of the additional terms : -a stream tube pre-entry force using CFD model integration or simple ID entrainment flow calculation (not directly measurable) is derived; a bell mouth buoyancy (pull-off) term also using the CFD or ID calculation as above. Static pressure measurement sensors (p0) are fitted at the traversing boom ($A_O$) plane; static pressure measurement sensors are fitted to the rear face of the bell mouth scroll; and static pressure measurement sensors ($P_j$) are fitted at the ($A_j$) plane. This can be achieved using an existing design of piezo-ring, which is additional to current base drag static pressure measurement.

This additional information enables the following additional terms to be quantified : -Pre-entry stream tube force (turning stream lines) from CFD and/or ID calculation; Pre-entry stream tube force (bell mouth pull-off) from CFD and/or ID calculation and/or measured static pressure $\Delta p$ (bell mouth-boom(p0)); Nozzle exit buoyancy force from CFD and/or measured static pressure $\Delta p$ (($p_{ref}$)-boom(p0)); Engine buoyancy forces shown are currently represented by base drag in the basic method. Friction drag is considered negligible.

It is to be noted that for present purposes : $p_{ref}$ is determined from $P_j$ with a correction defined from free field or nozzle rig measurements; $p_{ref}$ is also used for ram-ratio definition corrections in the engine performance synthesis model; and p0 should now replace cell pressure as the datum for basic method cradle and base drags.

Some of the above terms are self-cancelling. However, the net result for the highest flowing engine (currently in production) was between −0.2% & −0.3% of gross thrust relative to the basic first principles method. Although this revised method remains valid when testing smaller low flow engines in the regime described for the basic method, the estimated error is in the region of −0.02%.

Among the advantages and benefits obtained from use of the "First Principles" method are significant quality improvements; derived thrust correction uncertainty (including repeatability) is improved from an estimated ±0.8% to ±0.25%. This includes eliminating two of the calibration legs in a B-A-B type cross-calibration and the time taken waiting for acceptable free field testing environmental conditions in a typical inconsistent UK climate. Another significant benefit is the ability to calibrate an indoor test facility from the commencement of a new engine project. An ability to re-calibrate indoor test facilities (including masters) at any time "in situ", without reference to any other source, thus eliminating expensive A-B-A type back-to-back testing is another significant advantage.

The invention claimed is:

1. A method for determining the free field thrust of a gas turbine engine by use of an enclosed gas turbine engine test facility including:
    attaching the gas turbine engine to a movable support means;
    operating the gas turbine engine at a selected engine operating point;
    measuring the thrust applied by the engine to the thrust cradle via the thrust measurement means (net thrust, FN);
    calculating the gas turbine engine intake momentum drag generated by airflow into the gas turbine engine intake ($W_0V_0$),
    calculating the thrust cradle drag force generated by airflow past the moveable support means of the thrust cradle (cradle drag),
    calculating the base drag generated as a result of accelerating nozzle ejector airflow ($\int(p-p0)\delta A_{eng}$), wherein the calculating the base drag includes:
        calculating a pre-stream tube force related to turning of stream lines in the intake air path ($\int(p-p0)\delta A_{stream}$),
        calculating a pre-stream tube force related to a bell mouth pull-off force ($\int(p-p0)\delta A_{bm}$),
        determining forces (friction drag) due to forward anemometer plane ($P_0$) and nozzle static pressures ($P_{ref}$) and a nozzle exit buoyancy force ($A_j(P_{ref}-P_0)$), and
    summing the net thrust, the gas turbine intake momentum drag, the pre-entry stream tube force related to turning of stream lines in the intake air path, the pre-entry stream tube force related to a bell mouth pull-off force, the base drag, the cradle drag, the friction drag and the nozzle exit buoyancy force according to their respective positive and negative values to determine the free field thrust of the engine at the selected engine operating point.

2. The method of claim 1, wherein:
Gross thrust=Net Thrust (FN)+Inlet momentum (W0·V0)−Pre-entry stream tube force ($\int(p-p0)\delta A_{stream}$)−External bell mouth scroll buoyancy ($\int(p-p0)\delta A_{bm}$)+Engine buoyancy forces ($\int(p-p0)\delta A_{eng}$)+Cradle drag+Friction drag−nozzle exit buoyancy force $A_j(p_{ref}-p0)$.

* * * * *